United States Patent [19]

Andersson et al.

[11] Patent Number: 4,887,309
[45] Date of Patent: Dec. 12, 1989

[54] OPTICAL REPEATER FOR FAULT TRACING IN AN OPTICAL TRANSMISSION SYSTEM

[75] Inventors: Ove B. Andersson, Vännäs; Johan Berg, Göteborg; Per O. Granestrand, Tyresö ; Armand Vatsel, Skärholmen, all of Sweden

[73] Assignee: Telefonaktiebolaget L M Ericsson, Stockholm, Sweden

[21] Appl. No.: 205,689

[22] Filed: Jun. 13, 1988

[30] Foreign Application Priority Data

Jul. 16, 1987 [SE] Sweden .............................. 87028932

[51] Int. Cl.$^4$ .............................................. H04B 9/00
[52] U.S. Cl. ........................................ 455/601; 370/1; 455/600
[58] Field of Search ............... 455/601, 606, 607, 612, 455/600; 350/96.19; 370/1

[56] References Cited

U.S. PATENT DOCUMENTS

| | | | |
|---|---|---|---|
| 4,211,920 | 7/1980 | Wakabayashi | 455/601 |
| 4,266,183 | 5/1981 | Steensma et al. | 455/601 |
| 4,278,850 | 7/1981 | Sato et al. | 340/146.1 |
| 4,300,239 | 11/1981 | Wakabayashi et al. | 455/601 |
| 4,369,523 | 1/1983 | Seki et al. | 455/601 |
| 4,660,973 | 4/1987 | Mannschke | 455/601 |
| 4,783,851 | 11/1988 | Inov et al. | 455/6 R |

FOREIGN PATENT DOCUMENTS

| | | | |
|---|---|---|---|
| 0002971 | 7/1979 | European Pat. Off. | 455/612 |
| 3042815 | 5/1982 | Fed. Rep. of Germany . | |
| 0100759 | 7/1980 | Japan | 455/601 |
| 0105452 | 8/1980 | Japan | 455/601 |
| 2019167 | 10/1979 | United Kingdom | 455/601 |

Primary Examiner—Robert L. Griffin
Assistant Examiner—L. Van Beek
Attorney, Agent, or Firm—Burns, Doane, Swecker & Mathis

[57] ABSTRACT

The present invention relates to optical repeaters in a two-way optical line link, e.g. one included in a teletransmission system. The optical repeaters are implemented such as to provide a system which, inter alia in fault localizing, utilizes the line link transmission capacity optimally by completely optical through-connection of signals on the optical fiber cables. In fault localizing, one repeater at a time is checked, by an end terminal in the link transmitting a test signal including an address for selecting a repeater for testing and a test pattern. An optical amplifier amplifies the test signal in every repeater through which the signal passes, and when it reaches the repeater indicated by the address, a control circuit controls an optical switch such that the test signal is switched (loop connected) and is returned to the transmitting terminal where fault analysis takes place.

7 Claims, 1 Drawing Sheet

OPTICAL REPEATER FOR FAULT TRACING IN AN OPTICAL TRANSMISSION SYSTEM

TECHNICAL FIELD

The invention relates to an optical repeater for fault tracing in a two-way optical line link, such as is included in a teletransmission system.

BACKGROUND ART

Repeaters are used today in two-way optical line links for fault tracing, and these repeaters amplify optical signals electrically. The present repeaters therefore include an opto-electric converter for converting the optical signal to an electrical signal, an electronic amplifier which amplifies the electrical signal and an electro-optic converter which reconverts the electrical signal to an optical signal. An example of such repeater is disclosed in U.S. Pat. No. 4,300,239 to Wakabayashi et al. Fault tracing in optical links in accordance with this patent is performed by continuous monitoring, an end terminal transmits a test signal which points out a repeater for testing. The test signal is amplified in the selected repeater and an optical switch is subsequently placed in an ON condition, a small part of the test signal then being led through the switch and returned to that end terminal which sent out the test signal. In this end terminal the transmitted test signal is compared with the returned test signal for determining whether there is any fault in the selected repeater. All repeaters in the link are checked in this way. In a selected repeater the switch is thus placed in the ON condition, only a small portion of the test signal being run through the switch. The test signal is therefore amplified once again before it leaves the selected repeater. For a repeater which has not been pointed out, the optical switch is at OFF condition and the test signal is run through the repeater without passing through the switch.

DISCLOSURE OF INVENTION

In an apparatus in accordance with the Wakabayashi et al patent, an optical signal is amplified after opto-electric conversion with the aid of an electronic amplifier, the signal once again being converted to an optical signal after the amplification. The problem here is that the transmission rate of the signals is limited by the transmission capacity of the electronic components, this capacity being lower than the corresponding capacity of optical components, which is primarily due to the difference in frequency bandwidth. It is therefore an advantage if opto-electrical conversion can be avoided. Another problem with the apparatus according to the state of the art is that the optical switches only return a small part of the signal power, which means that a large part of the power is lost and the test signal must therefore be amplified once again before it leaves the repeater.

Briefly the apparatus which, according to the present invention, solves the above mentioned problems comprises optical repeaters including optical amplifiers for amplifying optical signals in a first optical fibre cable transmitting the signals in one direction and a second optical fibre cable transmitting the signals in the other direction, and an optical switch for switching a test signal, sent from an end terminal, from one to the other fibre cable in a fault localizing procedure, the test signal then being transmitted back again to the end terminal. During the fault localization procedure the end terminal sends a test signal, inter alia containing a repeater address, on the first fibre cable to a repeater pointed out by the address. In the selected repeater the test signal is amplified in the optical amplifier, whereon the optical switch connects the major portion of the test signal to the second fibre cable, which returns the test signal to the transmitting end terminal where this returned signal is analysed for faults. The ordinary signal transmission ceases when fault tracing takes place on the link.

Using the apparatus in accordance with the invention the transmission rate on the transmission line will be completely independent of the speed of the electronic parts, since no opto-electric conversion takes place in the signal path. The optical fibre capacity thus controls the transmission rate, which can be increased considerably. The optical repeater is designed such that practically the entire test signal passes through the switch, which means that a test signal does not need to be amplified once again after it has left the switch, but can be connected directly to the cable which returns the signal to the transmitting terminal. Accordingly, practically no power in the test signal is lost at switching. In addition, the apparatus in accordance with the invention has fewer components than an apparatus in accordance with the prior art. There is thus obtained greater reliability in respect of fault localization and signal transmission.

One object of the invention is therefore to achieve a system which, inter alia in fault tracing, optimally utilizes the optical line link transmission capacity by completely optical through-switching of the signals on the optical fibre cables.

BRIEF DESCRIPTION OF DRAWINGS

The apparatus in accordance with the invention will now be described with the aid of an embodiment example and with reference to the accompanying drawing, where.

BEST MODE OF CARRYING OUT THE INVENTION

The exemplifying embodiment illustrates a line link for two-way teletraffic using optical fibres. The line link includes optical repeaters designed such that possible faults in the link can readily be localized.

Figure 1:
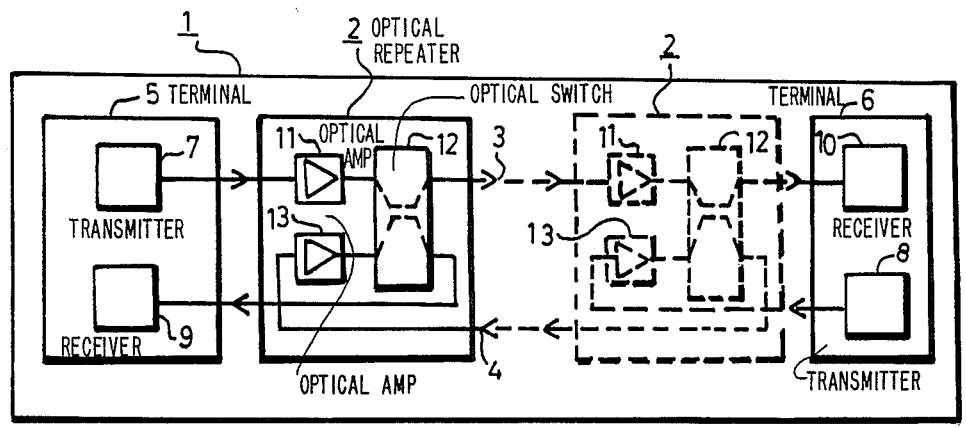
FIG. 1 illustrates optical repeaters in a line link included in an optical teletransmission system and FIG. 2 illustrates an optical repeater in accordance with the invention.

FIG. 1 illustrates a line link 1. Optical repeaters 2 are connected to a first optical fibre cable 3, which takes tele traffic in a first direction, and a second optical fibre cable 4 which takes tele traffic in a second direction. These cables 3, 4 are connected to a first and second end terminal 5, 6. The respective terminal is provided with a transmitter 7,8 for transmitting optical signals, and a receiver 9, 10 for receiving optical signals. In accordance with the embodiment, the repeaters are designed such that fault tracing takes place from the first terminal 5 and, transmitter 7 transmits a test signal on the first optical fibre cable 3. The test signal includes an address pointing out a repeater for testing, a test pattern and a final bit. The transmitter 7 in the first terminal 5 includes a fault localizing instrument, an interface circuit and a semiconductor laser, e.g. of Indium Gallium Arsenide Phosphite (InGaAsP). For fault localizing, this instrument sends a test signal in the form of a bit-coded sequence. The interface circuit controls the laser so that the optical signal out from the laser to the optical fibre cable 3 agrees with the sequence coming into the circuit. The receiver 9 includes an opto-electric converter as well as said fault localizing instrument, in which possible bit errors in a received test signal can be discovered. The task of the repeaters is to amplify the test signal, which takes place in an optical amplifier 11 in the first direction and, when the test signal reaches a repeater pointed out by the address, to switch the test signal to the second optical fibre cable 4 so that the test signal is returned to the receiver 9 in the transmitting terminal, i.e. the signal is loop connected. Switching takes place in an optical switch 12. The repeaters are also provided with an amplifier 13 for amplifying signals in the second direction so that the test signal is also amplified on its way back to the transmitting terminal. In the transmitting terminal 5 a reference pattern corresponding to the test pattern in the transmitted test signal is compared with the test pattern in the received signal. With the aid of the result of the comparison a fault analysis is made to detect a possible bit error.

One repeater at a time is checked in order, until the fault is traced. The procedure is started in the repeater situated closest to the transmitting terminal.

Figure 2:
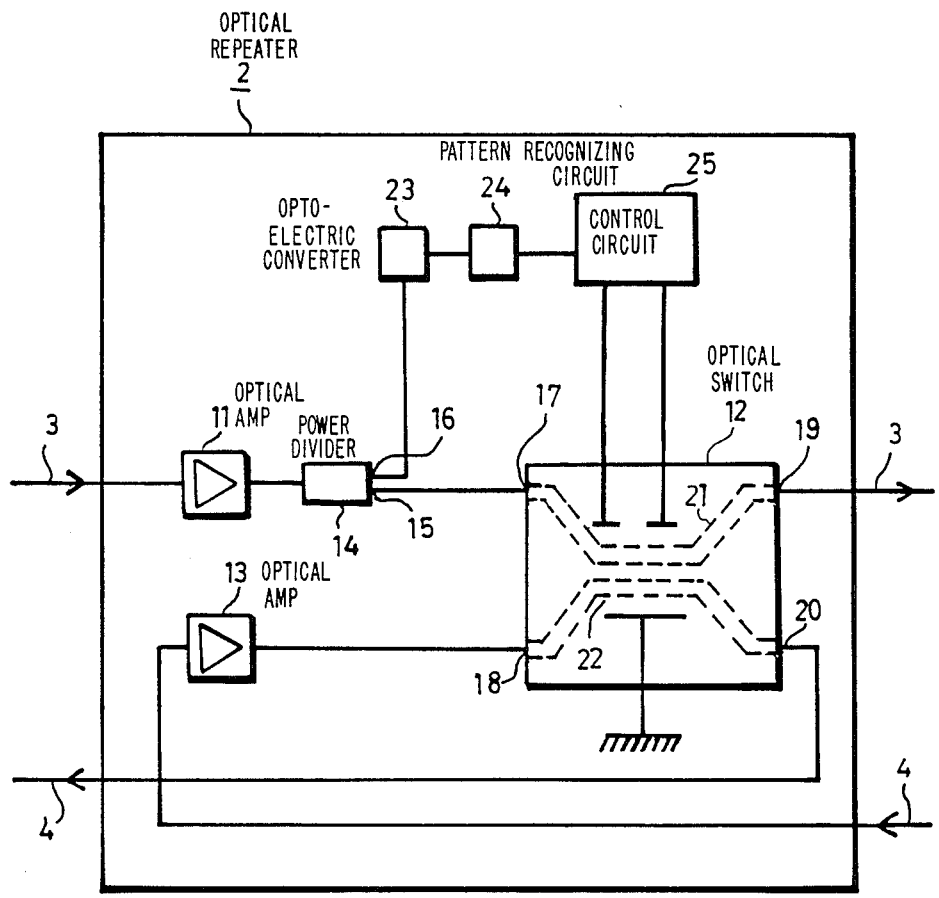

A block diagram of a repeater 2 in accordance with the invention is illustrated in FIG. 2. As previously mentioned, fault tracing takes place from the first terminal 5 (see FIG. 1), and a test signal is sent on the first optical fibre cable 3. The test signal is amplified in the first optical amplifier 11, which comprises a laser amplifier. The laser amplifier can be a so-called "travelling wave laser amplifier" (TWLA) which is anti-reflex treated. The test signal is then led to a power divider 14, in which the signal is divided so that a first part, e.g. 98% of the signal power, is directed to a first output 15 on the power divider, and a second part, e.g. 2% of the signal power, is directed to a second output 16 on the power divider. This power divider 14 can comprise, for example, a directional coupler with two juxtaposed wave guides, made from Lithium Nobiate with diffused titanium as wave guides (Ti:LiNbO$_3$). The first output 15 on the power divider is connected to a first input 17 on the optical switch 12 so that the first part of the test signal is taken to the first input 17 of the switch.

The optical switch also has a second input 18 for signals in the second direction, and two outputs 19, 20, of which the first 19 is connected to the first optical fibre cable 3, while the second output 20 is connected to the second optical fibre cable 4. The first input 17 of the switch is connected to its first output 19 via a first optical wave guide 12, and the second input 18 is connected to the second output 20 via a second optical wave guide 22. Electrodes are associated with the wave guides. The switch is controlled by different voltages being applied to the electrodes, causing a signal to pass through the switch directly from an input on one of the wave guides to its output, if a first voltage is applied to the electrodes, i.e. no switching is obtained, and a signal is switched over from one wave guide to the other if a second voltage is applied to the electrodes. In FIG. 2 the switch 12 is in a neutral position when no switching is obtained, and in a switching position when a signal is switched from one wave guide to the other. This switch may be fabricated in Lithium Nobiate with infused titanium as wave guides (Ti:LiNbO$_3$).

The second output 16 of the power divider 14 is connected to an opto-electric converter 23 in which the second part of the test signal is converted from an optical signal to an electrical signal. A pattern recognizing circuit 24 including a comparator is connected to an output on the converter 23 for recognizing the address in the test signal. A control circuit 25 is connected to an output on the circuit 24 for controlling the optical switch to go from neutral position to switching position, if the address corresponds to the repeater address, i.e. switching from the first optical fibre cable 3 to the second optical fibre cable 4.

The test signal is built up from a plurality of bits, and as previously mentioned, the first bits contain an address for selecting a repeater for testing. Remaining bits comprise a test pattern and a final bit, which directs whether the switch is to be switched back to the neutral position from the switching position after switching. When the pattern recognition circuit 24 in the selected repeater detects the repeater address it gives a pulse to the control circuit 25 which then changes the voltage on the electrodes over the wave guides in the optical switch 12 so that the switch assumes its switching position. The first part of the test signal is then switched from the first input 17 of the switch to its second output 20, and thereby to the second optical fibre cable 4, which returns the test signal to the transmitting terminal. Connecting a test signal in this way is known as loop connection. The returned test signal is subsequently analysed for faults in the transmitting terminal. When the circuit 24 detects the last bit in the test signal, the control circuit 25 is once again given a pulse for reswitching the switch 12 to its neutral position.

The pattern recognition circuit 24 decodes the address in each test signal which is sent from the transmitting terminal. When the test signal reaches a repeater which is situated before the repeater indicated by the address, the switch will remain it its neutral position, and the test signal will pass straight through the switch to the first optical fibre cable 3 and then onto the next repeater in the line link.

Test signals from a selected repeater in the second direction are amplified in the second optical amplifier 13 of the repeater and then passed straight through the switch, from the second input 18 to the second output 20 and then on the second optical fibre cable 4 to the receiver 9, (see FIG. 1) in the transmitting terminal 5.

The optical repeaters described above are thus implemented so that a completely optical through connection of the signals through the optical fibre cables is achieved, whereby the transmission capacity of the line link is utilized fully.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed:

1. Apparatus for fault localizing in a two-way optical line link, comprising:
    a first and a second end terminal each containing a transmitter and a receiver for respectively sending and receiving optical signals,
    a first optical fiber cable between the transmitter on the first terminal and the receiver on the second terminal for transmitting optical signals in a first direction, a second optical fibre cable between the transmitter in the second terminal and the receiver in the first terminal for transmitting optical signals in a second direction, a plurality of cascade connected optical repeaters connected in a chain to both of said cables, means for fault localizing whereby each of the repeaters in the chain are loop back connected in turn so that a test pattern sent by the transmitter in a transmitting terminal is fed back by a selected repeater to the receiver in said transmitting terminal, subsequent to which a comparison is made between a reference signal corresponding to the test pattern sent from the transmitter and the test pattern received in its receiver, wherein at least one optical repeater includes;

a first optical amplifier connected to said first optical fiber cable for amplifying optical signals in the first direction, a second optical amplifier connected to said second optical fiber cable for amplifying optical signals in the second direction, said transmitter during fault localizing transmits a test signal, said test signal including address bits and a test pattern, via said optical fiber cables, a power divider for dividing transmitted signals into a first and a second part connected to the output of said first optical amplifier, said power divider having a first output to which said first part of a transmitted test signal is applied, and a second output to which said second part of the transmitted test signal is applied, an optical switch for switching the test signal between said optical fiber cables having a first input connected to said first output on the power divider, a second input connected to an output on said second optical amplifier a first output connected to said first optical fibre cable and a second output connected to said second optical fiber cable, an opto-electric converter is connected to said second input on the power divider for converting said second part of the test signal to an electric signal, a pattern recognition circuit connected to an output on said converter for recognizing a repeater address in the test signal, a control circuit for controlling the optical switch connected to an output on said pattern recognition circuit, said control circuit controlling the optical switch such that the test signal is applied to either said first or said second output of the optical switch and said pattern recognizing circuit in the selected repeater actuates said control circuit on detecting the repeater address, said control circuit then sending a control signal to the optical switch such that the switch assumes a switching position in which said first part of the test signal is switched from the first input of the switch to its second output so that the test signal is fed back to the receiver in the terminal which transmitted said test signal.

2. Apparatus as claimed in claim 1, wherein said optical switch, on assuming said switching position, goes from a neutral position in which an optical signal passes through the switch from an input to its corresponding output without being switched.

3. Apparatus as claimed in claim 2, wherein, when the test signal has been switched in said optical switch, said optical switch is controlled such as to go from switching position to neutral position.

4. An apparatus for localizing faults in a two-way optical line link with test signals having addressing information and a test pattern, comprising:

a first end terminal including an optical transmitter including a fault localizing means which provides a comparison and fault analysis, and an optical receiver;

a second end terminal, said optical transmitter of said first end terminal being coupled with said second end terminal by a first optical fiber cable and said optical receiver of said first end terminal being coupled with said second end terminal by a second optical fiber cable; and at least one optical repeater connected along said optical fiber cables between said first end terminal and said second end terminal, said at least one optical repeater including:

an optical switch for switching signals between said first and second optical fiber cables, and control means for controlling operation of said optical switch, said control means including decoding means for decoding addressing information in said test signal;

said optical transmitter of said first end terminal operative to selectively transmit on said first optical fiber cable a test signal having addressing information characteristic of a selected optical repeater, said control means of said selected optical repeater responsive to said addressing information for producing a switch control signal to said optical switch, said optical switch responsive to said switch control signal to directly feed the test pattern of said test signal onto said second optical fiber cable for communication to said optical receiver, said fault localizing means operative to compare a received test pattern with the transmitted test pattern.

5. The apparatus of claim 4, wherein said control means includes:

a power divider connected with said first optical fiber cable for dividing transmitted test signals on said first optical fiber cable into a first part and a second part, said power divider having a first output to which said first part is applied and a second output to which said second part is applied, said optical switch being connected with said first power divider output;

an opto-electric converter connected with said second power divided output for converting said second part to an electric signal;

a pattern recognition circuit connected with said opto-electric converter for recognizing characteristic addressing information in said test signal; and a control circuit responsive to said pattern recognition circuit to produce said switch control signal to feed said first part to said second optical fiber cable.

6. The apparatus of claim 5, wherein said at least one optical repeater further includes an optical amplifier coupled between said optical transmitter of said first end terminal and said power divider.

7. The apparatus of claim 4, wherein said at least one optical repeater further includes an optical amplifier coupled between said optical transmitter of said first end terminal and said optical switch.

* * * * *